United States Patent

[11] 3,548,079

| [72] | Inventors | Paul Jones<br>Half Moon Bay;<br>Robert Allan Wold, Fremont, Calif. |
|---|---|---|
| [21] | Appl. No. | 825,292 |
| [22] | Filed | May 16, 1969 |
| [45] | Patented | Dec. 15, 1970 |
| [73] | Assignee | Raychem Corporation<br>Menlo Park, Calif.<br>a corporation of California |

[54] BULKHEAD FEEDTHROUGH
6 Claims, 5 Drawing Figs.

[52] U.S. Cl. .............................................. 174/153;
 285/158; 285/381
[51] Int. Cl. .............................................. H01b 17/26;
 F16l 5/02
[50] Field of Search .......................................... 174/Shrink,
 65, 65G, 153, 153G; 285/158, 159, 161, 162, 381;
 248/56; 277/178

[56] References Cited
UNITED STATES PATENTS

| 3,372,960 | 3/1968 | Fisher | 174/153(G)UX |
| 3,395,382 | 7/1968 | Weagant | 174/(shrink) |
| 3,423,518 | 1/1969 | Weagant | 174/153(G) |

Primary Examiner—Laramie E. Askin
Attorney—Lyon & Lyon

ABSTRACT: This invention comprises a bulkhead feedthrough device having two members, the first of which is heat recoverable and the second of which performs a wedging function. In operation, the first member is positioned such that it surrounds a conductor or other substrate and such that a portion thereof extends through an aperture in a bulkhead or the like. The first member is provided with an annular sleeve which is positioned radially adjacent to the aperture. The heat recoverable portion is then caused to recover around the substrate and the second member is inserted within the annular sleeve to force the sleeve radially outward into contact with the walls of the aperture. The construction of this device is such that installation thereof requires access to only one side of a bulkhead.

PATENTED DEC 15 1970
3,548,079
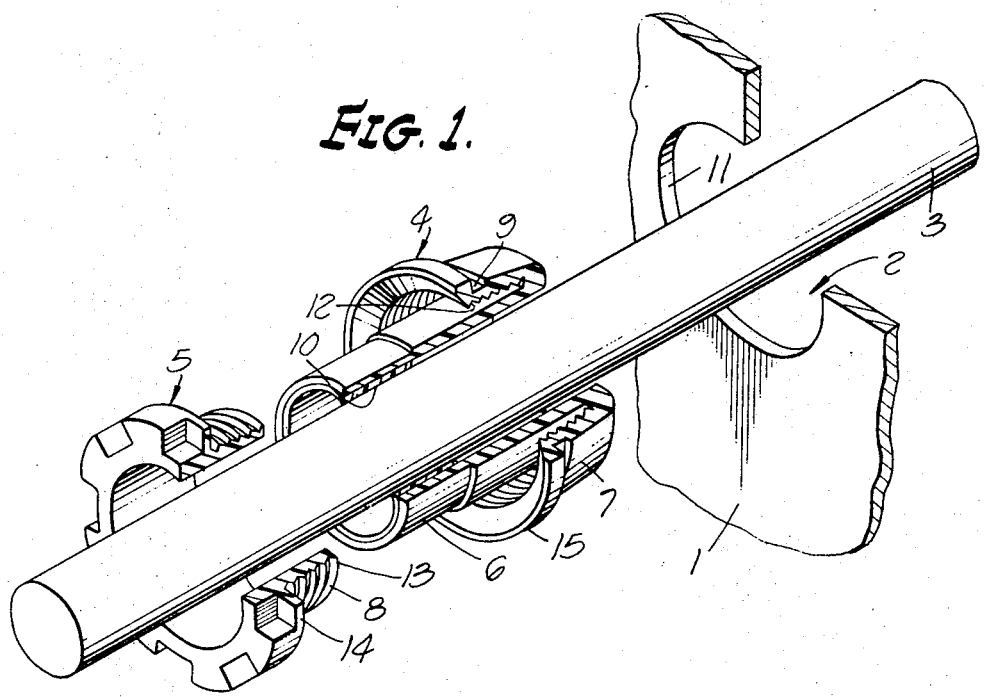
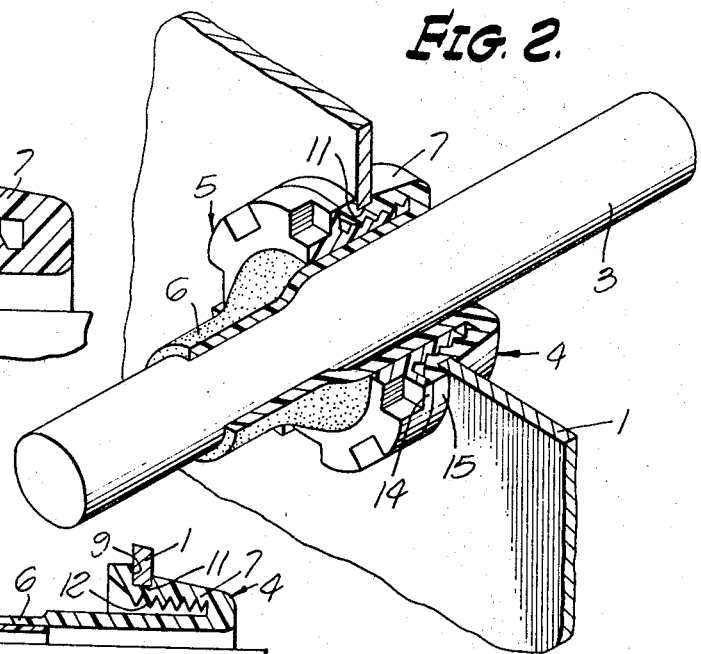
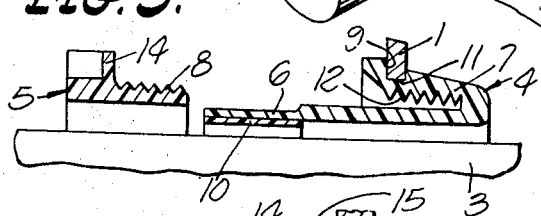
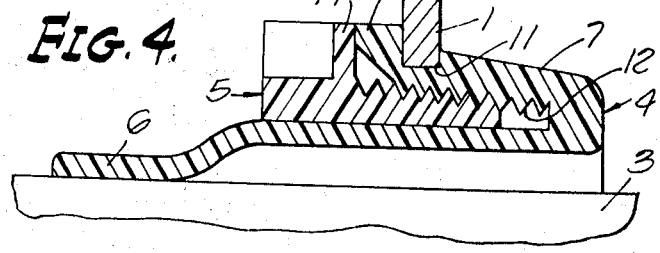
ROBERT A. WOLD
PAUL JONES
INVENTORS.
BY Lyon & Lyon
ATTORNEYS

3,548,079

1
BULKHEAD FEEDTHROUGH

BACKGROUND OF THE INVENTION

The present invention relates to a device for supporting elongated members such as electrical cables or the like when they pass through bulkheads, junction boxes or the like and providing a seal where such is desirable. In conventional wiring systems, it is often desirable to employ an airtight and watertight enclosure for housing junctions and other installations to prevent damage, corrosion or shorting of the conductors therein. One conventional practice to achieve such enclosure has been the use of an insulated stuffing box. However, stuffing boxes are cumbersome and difficult to adjust and a large number of separate components are required to produce the desired tight fit. More recently, the heat shrinkable grommet disclosed in U.S. Pat. No. 3,423,518 has been suggested. However, the grommet of that patent as well as other conventional sealing devices all suffer from the disadvantage that they require access to both sides of the bulkhead, junction box plate or the like in order for installation thereof.

Therefore, it is a primary object of the present invention to provide a simple and effective means for achieving a sealing of electrical cables or the like passing through apertures in junction boxes, bulkheads or the like which require access to only one side of the member in which the aperture is formed.

It is another object of the present invention to provide such a device wherein the device exerts a radial pressure on the walls of the aperture in which it is installed while at the same time exerting a compressive force in an axial direction.

Other objects and advantages, it is believed, of the present invention will become apparent from the following detailed description of specific embodiments thereof.

BRIEF DESCRIPTION OF THE DRAWINGS

FIG. 1 is an exploded perspective view of one embodiment of the invention in unassembled form;

FIG. 2 is a perspective view of the same embodiment in installed form;

FIG. 3 and FIG. 4 are partial cross-sectional views of the same embodiment in unassembled and assembled form respectively; and FIG. 5 is a partial cross-sectional view of a modification of the invention.

SUMMARY OF THE INVENTION

Referring now to the drawings, FIG. 1 shows a bulkhead, junction box plate or the like 1 having an aperture 2 therein. (The walls of the aperture as shown in FIGS. 1 and 2 constitute an arc of 270° only for purposes of illustration and it is to be understood that in the conventional case the walls of the aperture will constitute a full circle or an arc of 360°. However, the device of the present invention is suitable for use in an aperture having segmented walls.) Conductor 3, which may or may not be insulated, is shown as passing through aperture 2. The device of the present invention comprises a first tubular member indicated generally by the numeral 4 and a second tubular member or retaining nut indicated generally by the numeral 5. First tubular member 4 comprises heat shrinkable boot or sleeve portion 6 and a cup-shaped grommet portion 7. The grommet portion is not heat shrinkable. Retaining nut 5 is provided with tapered threads 8. Preferably, grommet portion 7 of member 4 is provided with threads on its interior surface, a groove 9 on its exterior surface, and a stop portion 15, and boot portion 6 is provided with an internal coating or insert of a fusible or flowable material 10 capable of functioning as a sealant. Material 10 may or may not harden after installation of the device.

In order to install the device of the present invention, grommet portion 7 of member 4 is passed through aperture 2 such that groove 9 comes into engagement with wall 11 of aperture 2 and stop portion 15 engages the portion of the wall around the aperture 2. It will be understood by those skilled in the art that when the preferred embodiment of the present invention, which includes groove 9, is used, the axial dimension of groove 9 must be sufficiently large to accommodate wall 11. In practice, only a moderate number of parts having grooves of different sizes is required to permit use of the present invention with the wall thicknesses conventionally encountered in the field since a single groove size can accommodate a reasonable number of wall thicknesses having an axial dimension less than the axial dimension of the groove.

Once the grommet portion 7 has been installed in the aperture 2 with conductor 3 passing therethrough, heat recoverable boot 6 is subjected to heat sufficient to cause it to change shape by shrinking around conductor 3. At the same time, fusible or flowable insert or coating 10 is brought into intimate contact with the conductor 3. It is preferred that material 10 have strong adhesive properties such that it forms an effective bond between boot 6 and conductor 3. The retaining nut 5, which also functions as a sealing means, is then threaded into engagement with thread 12 in the wall of grommet 7. Since threads 8 of retaining nut 5 are tapered such that the effective diameter of the threads increases as they progress from end 13 of retaining nut 5 toward the midportion thereof, threaded portion 8 of retaining nut 5 functions as a wedge and forces the wall of grommet 7 containing groove 9 into intimate contact with wall 11 and exerts radial compressive force thereon. At the same time, stop portion 14 of retaining nut 5 and stop portion 15 of member 4 are brought into contact with each other as shown most clearly in FIG. 4 such that they are held in lateral compression.

The end result is that heat shrinkable boot 6 functions to form an effective airtight and watertight seal around conductor 3 while grommet portion 7 of member 4 cooperates with retaining nut 5 to form an effective circumferential seal against the wall 11 of aperture 2.

FIG. 5 shows a modification of the device shown in FIG. 4. In FIG. 5, the retaining nut is provided with threads on its inner surface rather than on its outer surface. These threads cooperate with threads formed on the outer surface of the boot portion 6. The outer surface of the retaining nut 5 is tapered as is the interior surface of the grommet 7 so that the wedging action previously described is obtained.

The materials from which the various parts of the device of the present invention are fabricated do not, as such, form a part of the present invention and suitable materials are well known to those skilled in the art. For example, suitable heat recoverable materials which may be used to fabricate boot 6 are disclosed in Cook et al. U.S. Pat. No. 3,086,242 and copending application Ser. No. 65,953, filed Oct. 31, 1960 and assigned to the assignee of the present application, both of which are incorporated by reference. Furthermore, Wetmore U.S. Pat. Nos. 3,243,211 and 3,297,819, both of which are incorporated by reference herein, disclose suitable heat recoverable materials and, in addition, the former discloses suitable fusible inserts for use as material 10 and the latter discloses suitable flowable materials suitable for use as material 10. Still further, the aforementioned U.S. Pat. No. 3,423,518 which is also incorporated by reference herein, discloses suitable materials for use in the heat recoverable boot 6, grommet 7, and retaining nut 5 as well as material 10 of the present invention. Preferably, the retaining nut 5 is fabricated of a more rigid material than the grommet 7; for example, it may be constructed of a metal such as aluminum or a hard plastic such as nylon, polypropylene, polysulfone, etc.

The device of the present invention combines the advantages of the effective seal achieved by heat shrinkable boot, preferably in cooperation with material 10, the lateral and circumferential sealing function of retaining nut 5 and grommet 7 and the capability of being installed with access to only one side of a bulkhead, junction box plate or the like. The device of the present invention may be used with different sizes of conductor or cable 3, provided that the diameter of conductor or cable 3 is greater than the minimum diameter to which boot 6 is capable of shrinking.

We claim:

1. An assembly for sealing an electrical conductor within an aperture in an enclosure comprising a first tubular member comprising an annular cup-shaped grommet portion and a sleeve of heat shrinkable material integral with said grommet portion, the interior surface of the outer wall of said cup being provided with threads; and a second tubular member, the outer surface of said second tubular member being provided with threads capable of engaging the threads in said first tubular member when said second tubular member is inserted into said cup-shaped portion, the threads on said second tubular member being of progressively increasing diameter such that said second tubular member exerts an outwardly wedging action on the outer wall of said cup-shaped portion when said second tubular member is screwed into said first tubular member.

2. The assembly of claim 1 wherein the outer surface of said cup-shaped portion is provided with a circumferential groove.

3. The assembly of claim 1 wherein the integral surface of said heat shrinkable material is provided with a material selected from the group consisting of fusible inserts and flowable materials capable of bonding said shrinkable material to a substrate.

4. The assembly of claim 1 wherein said second tubular member is provided with a radially extending flange which is brought into abutting contact with the outer extremity of the outer wall of said cup-shaped portion when said second tubular member is screwed into said first tubular member.

5. An assembly for sealing an electrical conductor within an aperture in an enclosure comprising a first tubular member comprising an annular cup-shaped grommet portion and a sleeve of heat shrinkable material integral with said grommet portion, the interior surface of the outer wall of said cup being provided with threads, the outer surface of said cup-shaped portion being provided with a circumferential groove, the internal surface of said heat shrinkable material being provided with a material selected from the group consisting of fusible inserts and flowable material capable of bonding said shrinkable material to a substrate; and a second tubular member, the outer surface of said second tubular member being provided with threads capable of engaging the threads in said first tubular member when said second tubular member is inserted into said cup-shaped portion, the threads on said second tubular member being of progressively increasing diameter such that said second tubular member exerts an outwardly wedging action on the outer wall of said cup-shaped portion when said second tubular member is screwed into said first tubular member and said second tubular member being provided with a radially extending flange which is brought into abutting contact with the outer extremity of the outer wall of said cup-shaped portion when said second tubular member is screwed into said first tubular member.

6. An assembly for sealing an electrical conductor within an aperture in an enclosure comprising a first tubular member comprising an annular cup-shaped grommet portion and a sleeve of heat shrinkable material integral with said grommet portion, the interior surface of the outer wall of said cup being inwardly tapered; and a second tubular member, the inner surface of said second tubular member being provided with threads capable of engaging threads on said first tubular member when said second tubular member is inserted into said cup-shaped portion, the outer surface of said second tubular member being tapered such that said second tubular member exerts an outwardly wedging action on the outer wall of said cup-shaped portion when said second tubular member is screwed into said first tubular member.